(12) United States Patent
Odell et al.

(10) Patent No.: US 10,861,348 B2
(45) Date of Patent: Dec. 8, 2020

(54) CROSS-APPLICATION FEATURE LINKING AND EDUCATIONAL MESSAGING

(71) Applicant: MICROSOFT TECHNOLOGY LICENSING, LLC, Redmond, WA (US)

(72) Inventors: Alexis Thomas Odell, Mercer Island, WA (US); Vlad Riscutia, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 280 days.

(21) Appl. No.: 15/927,008

(22) Filed: Mar. 20, 2018

(65) Prior Publication Data

US 2019/0295439 A1 Sep. 26, 2019

(51) Int. Cl.
*G09B 19/00* (2006.01)
*H04L 29/08* (2006.01)
*G06F 3/0484* (2013.01)
*G09B 5/02* (2006.01)
*G06F 9/451* (2018.01)

(52) U.S. Cl.
CPC ....... *G09B 19/0053* (2013.01); *G06F 3/0484* (2013.01); *G06F 9/453* (2018.02); *G09B 5/02* (2013.01); *H04L 67/32* (2013.01)

(58) Field of Classification Search
CPC ... G06F 9/453; G06F 3/0484; G09B 19/0053; G09B 5/02; H04L 67/32
See application file for complete search history.

(56) References Cited

U.S. PATENT DOCUMENTS

| | | | |
|---|---|---|---|
| 6,345,386 B1 | 2/2002 | Delo et al. | |
| 9,253,513 B1 | 2/2016 | Finster et al. | |
| 2002/0126140 A1* | 9/2002 | Gorbet | G06F 9/453 |
| | | | 715/708 |
| 2002/0129054 A1* | 9/2002 | Ferguson | H04L 29/06 |
| | | | 715/212 |
| 2005/0050088 A1* | 3/2005 | Kotler | G06F 40/18 |
| 2007/0043569 A1 | 2/2007 | Potter et al. | |
| 2007/0186168 A1* | 8/2007 | Waldman | G06F 40/166 |
| | | | 715/732 |
| 2009/0089751 A1* | 4/2009 | Raikes | G06F 9/453 |
| | | | 717/120 |
| 2011/0200980 A1 | 8/2011 | Takahashi et al. | |

(Continued)

OTHER PUBLICATIONS

Azim, et al., "uLink", Mobile Systems, Applications and Services, In Proceedings of the 14th Annual International conference on Mobile Systems, Applications, and Services, Jun. 20, 2016, 14 Pages.

(Continued)

*Primary Examiner* — Nathan Hillery
(74) *Attorney, Agent, or Firm* — NovoTechIP International PLLC

(57) ABSTRACT

A method and system for providing educational content for use in a computing device to facilitate the training of users in new features across applications is disclosed. A package is delivered to a first application that includes a deep link to a specific feature available in a second application. When a triggering event occurs, the user may be invited to explore or use the feature and/or be automatically directed to the feature in the second application.

20 Claims, 10 Drawing Sheets

(56) References Cited

U.S. PATENT DOCUMENTS

| | | | |
|---|---|---|---|
| 2013/0091205 A1* | 4/2013 | Kotler | H04L 65/4015 709/204 |
| 2013/0091440 A1* | 4/2013 | Kotler | G06Q 10/10 715/753 |
| 2013/0097481 A1* | 4/2013 | Kotler | G06F 3/0482 715/230 |
| 2014/0173602 A1* | 6/2014 | Kikin-Gil | G06Q 10/109 718/100 |
| 2015/0081764 A1 | 3/2015 | Zhao et al. | |
| 2015/0143211 A1 | 5/2015 | Kaufthal et al. | |
| 2015/0154644 A1 | 6/2015 | Saxena et al. | |
| 2016/0350135 A1* | 12/2016 | Novitchenko | H04L 67/22 |
| 2017/0039248 A1* | 2/2017 | Morris | G06F 16/2425 |
| 2017/0249344 A1 | 8/2017 | Peters et al. | |
| 2017/0315979 A1* | 11/2017 | Boucher | G06F 16/2282 |

OTHER PUBLICATIONS

"International Search Report and Written Opinion Issued in PCT Application No. PCT/US19/021714", dated Jun. 27, 2019, 11 Pages.

"In-app deep link routing", Retrieved from <<https://docs.branch.io/pages/deep-linking/routing/>>, Feb. 12, 2018, 14 Pages.

* cited by examiner

US 10,861,348 B2

CROSS-APPLICATION FEATURE LINKING AND EDUCATIONAL MESSAGING

BACKGROUND

Users of computer systems and portable devices often times are unaware of the wide array of features or updates available for the various applications installed on their device. Typically, when a user engages with a software program, the user accesses only those features with which the user has working familiarity. This is particularly true if new features that would better serve the user during a particular project are available in another, separate program rather than in the application the user is currently using.

The deployment of new features or updates for client devices and cloud solutions can include training tools with the goal of improving and optimizing utilization. However, user training and preparation may consume significant resources and performance at a both an individual and collective level. This is in large part due to the time needed to discover features that might be potentially relevant to a project, as well as the challenge of identifying the process by which to implement an unfamiliar tool.

In some cases, users may wish to become familiar with new tools provided in software applications. Although online searches for features can be useful, the search results can be so broad that a user finds it difficult to sort through and locate the desired tool or solution. In addition, online searches do not limit the query to applications that are currently available to a user. Furthermore, the options presented to the user may not include the direct training necessary for a user to implement the new feature and readily incorporate its use into a project. Thus, there remain significant areas for new and improved ideas for the education of users in the availability and employment of new application features.

SUMMARY

A system to provide content associated with an application, in accord with a first aspect of this disclosure, includes one or more processors and one or more non-transitory computer readable media. The non-transitory computer readable media include instructions which, when executed by the one or more processors, cause the one or more processors to register a first package with a first native application, wherein the first package associates a first usage pattern with a first triggering event and specifies at least a first native control to invoke in response to the first triggering event. The non-transitory computer readable media also includes instructions to determine, during use of the first native application, that the first triggering event has occurred based on a detected occurrence of the first usage pattern, and in response to the determination that the first triggering event has occurred, cause the first native application to invoke the first native control which presents a first user interface element allowing navigation to a first feature of a second native application. Furthermore, the non-transitory computer readable media has instructions to receive a first user input indicating a selection of the first user interface element and, in response to receiving the first user input, automatically navigate to the first feature of the second native application.

A method executed on a computing device to present educational content associated with an application, in accord with a second aspect of this disclosure, includes registering a first package with a first native application, where the first package associates a first usage pattern with a first triggering event and specifies at least a first native control to invoke in response to the first triggering event. The method also includes determining, during use of the first native application, that the first triggering event has occurred based on a detected occurrence of the first usage pattern. In addition, in response to the determination that the first triggering event has occurred, the method includes causing the first native application to invoke the first native control which presents a first user interface element allowing navigation to a first feature of a second native application. The method further involves receiving a first user input indicating a selection of the first user interface element, and, in response to receiving the first user input, automatically navigating to the first feature of the second native application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

A significant challenge associated with software applications is discovering and learning about new or useful features. As one example, there has been a growing trend where users can take advantage of subscription models for various applications. While this model can offer the user a stream of evolving feature and/or an increasing number of tools, educating such a user about the features and familiarizing the user with the new tools can be ineffective in many cases. The following disclosure describes a means of educating users and increasing awareness of new or existing features across different applications through cross-linked targeted messaging. The cross-linked messages can direct users working with a first application to a specific feature in the second client application. Furthermore, the cross-linked message can include information on launching the second application, highlighting the specific feature and/or helping the user learn how to use the feature. Rather than going online or performing a web search for information regarding their toolkit, or searching for a tool that is not available for use with the first application, the user can receive guidance and access to the desired tools directly, and in some cases, locally.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Figure 1:
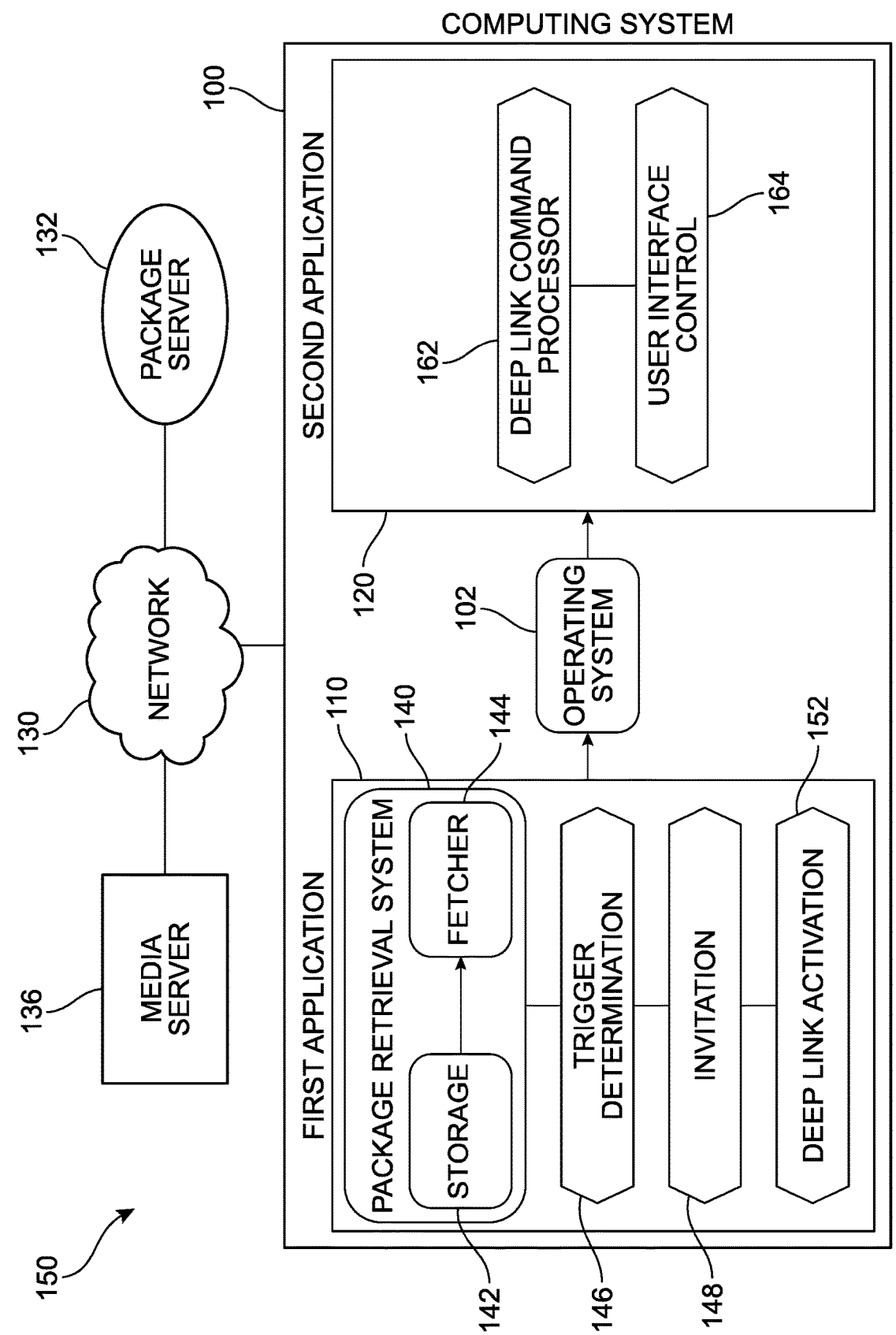
FIG. 1 is a conceptual diagram illustrating a distributed computing environment for displaying a message associated with a second application from within a first application and opening the second application through interaction with the message.

In FIG. 1, an example of a representative architecture of a distributed computing environment ("environment") 150 for implementing the cross-linking messaging is illustrated. The environment 150 can be configured to display a message that is associated with a second application from within a first application. The environment 150 can be further configured to open the second application through interaction with the message. As shown in FIG. 1, the environment 150 includes a client computing system ("client system") 100 and a network 130. As will be discussed in detail further below, the client system 100 can be configured to deploy a package which includes a deep link, or an "anchor" to a specific application feature, and/or educational message content (image, video, text, or other data). In some implementations, the client system 100 can also include a mechanism for an application to interpret packaged content by navigating to the application page corresponding to the deep link, rendering a teaching interface or callout that is located at the given "anchor" and presenting the packaged image, video and/or text, or other data. In different implementations, the packages and cross-linking mechanisms described herein can enable a user to access features, tools, and aspects of the computing environment that may not be readily apparent or known to the user. Furthermore, the network 130 can include provisions for accessing, managing, storing, and/or transmitting data. In FIG. 1, the network 130 is connected to a package server 132, which may include a package storage or repository (in some cases, the repository may comprise a separate server) 134 as well as an optional media server 136. In some implementations, the media server 136 can include larger files associated with various packages that can be downloaded on an as-needed basis.

In different implementations, the package server 132 can respond to requests from a client computing system for any new or updated packages. In some examples the package server 132 is configured to selectively provide packages based on characteristics determined for the requesting client system. The package server 132 can be configured to manage and perform automatic software updates for various computing devices and operating systems. In one implementation, the package server may include a package module and a package database. The package module may manage the provisioning operations for the package server while provisioning various client devices with software updates or packages. The package database may store multiple software update packages. The software update packages may each correspond to a particular client system, and/or one or more particular software applications. When a computing device connects to the package server, the package server can be configured to perform an analysis to determine whether the client system needs or otherwise qualifies for a particular package. When the communications device connects and the server receives information or instructions to deliver or deploy a package, the package server can retrieve the specified software package from the package database. The package server may further deliver the retrieved software package to the requesting client device. In one implementation, these deliveries can occur during periods when the system is in a low-use state, or during scheduled update periods ("out-of-band delivery"). In some cases, the system needs only to download new packages to provide the cross-link mechanism, and does not require additional client changes. This can facilitate the advertisement of any number of features, potentially customized to the user's behavior (features a user might be interested in). Furthermore, once the packages have been delivered, the deployment and/or activation of the package and associated deep link can occur without an internet or other network connection, allowing users to access these features while both online and offline.

Generally, the package server 132 may periodically receive software update packages from a managing server that may push software updates to the package server 132 when ready, or provide the software updates in response to a request by the package server. In addition, the package server 132 may 'push' software updates to the client system 100, or provide the software updates in response to a request by the client system 100. When providing software updates in response to an explicit request, such operations may be referred to as "pull" operations. When the requesting client device receives the package from the package server, the requesting client device may also install the contents of the package. This may be accomplished using a local installer program or with a self-extracting installer, as an example.

For purpose of this description, the term "software application", "software", or "application" refers to a computer program that performs useful work, generally unrelated to the computer itself. Some non-limiting examples of software applications include word processors, spreadsheets, accounting systems, and telecommunication programs, as well as, gaming software, utility and productivity tools, mobile applications, presentation graphics, and other productivity software. Furthermore, use of the term "original software application" or "original application" refers to a software application as originally downloaded and installed. An original installation set can include a set of installation files and/or data from which the original software application may be installed onto a client computer. In general, an original installation set is duplicated onto distribution media, such as an optical disk, a magnetic disk, magnetic tape, and other such media. In some cases the original installation set (and/or update installation set) may also be a collection of files and/or data on a fixed disk drive associated with the client computer, or alternatively, on a network-accessible drive, or an Internet location. Thus, while subsequent references to the original installation set may be made with regard to an installation set on an optical disk (or disks), it is for simplicity purposes only, and should not be construed as limiting upon the present disclosure.

Correspondingly, the term "updated software application" refers to the software application after installing or applying any packages of an update installation set to that software. In some cases, such updates take the form of software packages. An update installation set may include a set of installation files and/or data from which the updates are applied to an original software application installed on a client computer. Updates can include, for example, software fixes, version updates, as well as packages configured to work with a first application and initiate use of a second, different application, as will be described in greater detail below. An update installation set, as with the original installation set, may be delivered on removable media (optical disks, magnetic tape, and the like) or as files and/or as data located locally or remotely to the client computer. In different implementations, an update installation set may include features specific to a particular customer segment or niche, such as small businesses, physically impaired users, the legal market, other business types, students, and/or other segments of society. Similarly, the update installation set may deliver a payload designed to modify the original software application for requirements of a particular country and/or language. A package may be installed without requiring changes to the original or previous software installation. Thus, an updated software application may include not only the application itself but also upgrades to the application and various settings and features of the application.

For purposes of this application, the term packaged content or package refers to a unit of data in which multiple content assets are bundled. The term "content asset" or simply "asset" refers herein to an individual content item that may or may not have been separately created from other content items. An asset may itself comprise subparts such as sections, images, text blocks, tables, parameters, or other pieces of data. Some assets include, but are not limited to, text content, image content, video content, sound content, other content types, and combinations thereof. Each asset may be stored or able to be stored or transmitted or able to be transmitted as an individual file, such as a raster image file, portable document format ("PDF") file, hyper-text-markup-language ("HTML") file, Adobe® Flash® formatted content such as a small web format (SWF) file, javascript content, a rich Internet application, and other interactive content. Assets of different kinds may be included in a content package and, in some implementations, included in a package that is provided as a single file. In some implementations, a packaged content may include metadata to provide various content presentation features, navigation features, and/or to provide other information.

In some cases, packages may be incorporated, stored, or executed within the architecture of a first application. Furthermore, in one implementation, a package may be configured to work in conjunction with the first application and to specify which native controls to invoke in response to which triggering events. The package can also indicate which assets should be deployed in the controls. In some implementations, the execution of the package can cause the system to open a second application for the experience of the user.

For purposes of this description, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls. Furthermore, a "trigger event" or "triggering event" refers to an event (or specific sequence of events) associated with a particular use of an application, which is then used to trigger the display of a native control in a native application. In addition, as noted earlier, the term "asset" will refer to content that may be presented in association with a native control in a native application. Thus, as non-limiting examples, an asset may include text in a pop-up window, audio associated with the interactive click of a button or other native application object, video associated with a teaching user interface, or other such information presentation.

As a more specific, non-limiting example, the application suites or programs that are associated with the client device may be updated with packages that enable application suite clients to experience additional or new interfaces associated with other applications. In an example related to Microsoft® Office, the mechanism will enable Office® clients to display a UI during use of a first application in which a particular feature that is found in a second application is advertised. Such packages can be especially advantageous in subscription-model type applications, in which new or updated features may be rolled out to a client in an ongoing basis.

In different implementations, the package may be stored and/or transferred as one or more files. In some cases, packaged content may be formatted as a data-compressed and/or archive-formatted file such as a file compressed using ZIP compression or other data compression and combination technologies. The packaged file may allow appending of new assets. Upon execution, the package can be configured to extract one or more of the contained files or assets.

In one example, the present disclosure describes a method and system for receiving packages and then displaying native controls that include cross-linked messages. The cross-linked messages are displayed in one application and are configured to offer or invite a user to learn about new or existing application features for a second, different application. As shown in FIG. 1, the client system 100 is configured to communicate information across applications. For example, a first application module 110 can retrieve a package and be configured to launch a second application module 120. The first application module 110 can also be configured to 'hand off' some or all of a package to the second application module 120. This type of cross-linking mechanism can provide users with a relatively non-intrusive and straightforward process for discovery of different features across applications.

As an example, a system may enable a user to 'click' or link from an invitation message displayed during use of the first application module 110, where the message is directed to a feature available in the second application module 120. For purposes of this application, this type of navigation or linking between a first application and another application may be referred to as cross-linking or inter-application linking. In response to some input or response from a user, the system can open or initialize the second application and/or navigate to the recommended feature in the second application via cross-linking.

Furthermore, in some implementations, the message includes the ability to navigate to a view within the second application that exposes the showcased feature. In one implementation, this mechanism is associated with a deep link, as will be discussed further below. A message that provides an option to navigate outside the first application to a second application may be referred to as an "inter-app message" or "cross-linked message". In addition, some implementations of inter-app messages can include navigation to a teaching UI anchored to the feature (including video, image, and/or text). As a result, users can discover and engage with an application feature that interests them by navigating directly to the suggested feature in the application.

The client system 100 further includes an operating system 102, configured to manage communications between various components in the client system 100. In FIG. 1, the operating system 102 provides a bridge or connection between at least the first application module 110 and the second application module 120. Thus, when packages or package-related information are communicated via network 130 the operating system 102 can convey the information to the appropriate component or application. For example, when a package is delivered to the client system 100 from the network 130, the operating system 102 can transmit the package to the first application module 110.

In different implementations, the first application module 110 can include provisions for storing, retrieving, and receiving packages, as well as determining the occurrence of a triggering event, executing packages, displaying various UIs, and/or activating deep links. In FIG. 1, the first application module 110 includes a package retrieval system ("retrieval system") 140. The retrieval system 140 further includes a storage module 142 and a fetcher module 144. The storage module 142 can save, hold, or otherwise store packages that are fetched or retrieved via the fetcher module 144. The retrieval system 140 can be linked to a trigger determination module 146 that is configured to assess user activity and/or client system telemetry and/or other factors and determine whether a trigger event associated with a particular package has occurred. In cases where a determination is made that a triggering event has occurred, an invitation module 148 can issue or present an invitation or dialog box to a user, via which the user can choose to proceed with additional training in the second application. If the user accepts the invitation, a deep-link activation module 152 can communicate with the operating system 102 in order to navigate to a particular location in the second application module 120.

In some implementations, the second application module 120 can include provisions for receiving information from the first application module 110. For example, when the deep-link activation module 152 is activated, a deep-link command processor 162 can be configured to receive a signal and issue a command within or to the second application module 120, for example to a user interface control module 164, and open and navigate to a specific feature landing, rather than to the general second application landing. In other words, whereas the default opening, start screen, or "initial location" of the second application as typically accessed would not necessarily highlight or display the recommended feature, the deep-link mechanism can bypass or speed through the default opening page and proceed to a second location. This second location can be associated with a set of "coordinates" for the software program or application that is different than the first set of coordinates, where the first set of coordinates refers to the default location or standard location that is opened or launched when the program is normally accessed. The second, different set of coordinates can be anchored to the specific feature that is being showcased or presented, while the first set of coordinates is associated with a more generalized or 'main' application page. In some cases, the second set of coordinates can refer to a location that includes the application page itself as well as one or more content assets or native controls that directly present or guide a user in the uses and benefits of the feature. For example, the deep-link can navigate to a secondary page that includes one or more dialog boxes or media to 'walk' the user through the use of the feature. Thus, each deep-link in a package can be used to transport a user directly to a specific feature or function, substantially decreasing the time required to access the tools and encouraging user training and application competence.

In other implementations, the architecture described herein may vary. For example, in some implementations, the trigger determination module may be independent of the first application module 110. In other words, the operating system may receive information from a trigger determination module 146 that is separate from an application module and use that information to execute an appropriate package associated with an application. Similarly, in some implementations, the package may be downloaded such that a first portion of the package is incorporated or moved into a first application storage module and a second portion of the package is incorporated or moved into a second application storage module. This can allow the client system 100 to distribute the package-related operations across applications. In some implementations, an extra-application module can be configured to manage several application-type packages collectively. As another example, the downloaded packages may be stored independently of the applications, in a package repository module managed by the operating system 102, and delivered or transmitted to an application only when a specified trigger event has been detected. Similarly, the determination of whether a triggering event has occurred and/or executes the activation of a package may also be managed by a module that is independent of the various applications. In other implementations, the functions associated with the deep link command processor module 162 and the user interface control module 164 may be integrated into one module, or there may be additional modules to provide supporting functions and facilitate a substantially seamless transition between the two applications.

Thus, in some implementations, the methods and systems provided herein can permit users to access alternate, secondary applications or 'apps' during or through the use of a first application. For example, in some implementations, a message may be presented in the context of a first native application via the interface or controls that are part of the first native application. The message can be an inter-app message configured to direct users to features available in a second native application. In one implementation, a targeted message can be configured to be displayed when a triggering event occurs.

As noted above, in some implementations, packages may include provisions for navigating directly to a specific page, a specific feature location, or other specific relevant content in an application, such as educational content. For example, packages can include access to deep links. For purposes of this application, a deep link refers to a process by which one may directly connect or bridge from a first location or page to a second location or page. In other words, a deep link can provide a shortcut or 'jump' type of function that enables launching of and/or linking to specific feature pages or sections within a hierarchy or architecture of a software application, passing over or avoiding the broader or more general locations that would otherwise be traversed by the user in order to arrive more precisely at the sought-after destination. In one implementation, the deep link can transfer a user to a specific content page or UI, as opposed to a landing page of a software application or website.

Figure 2:
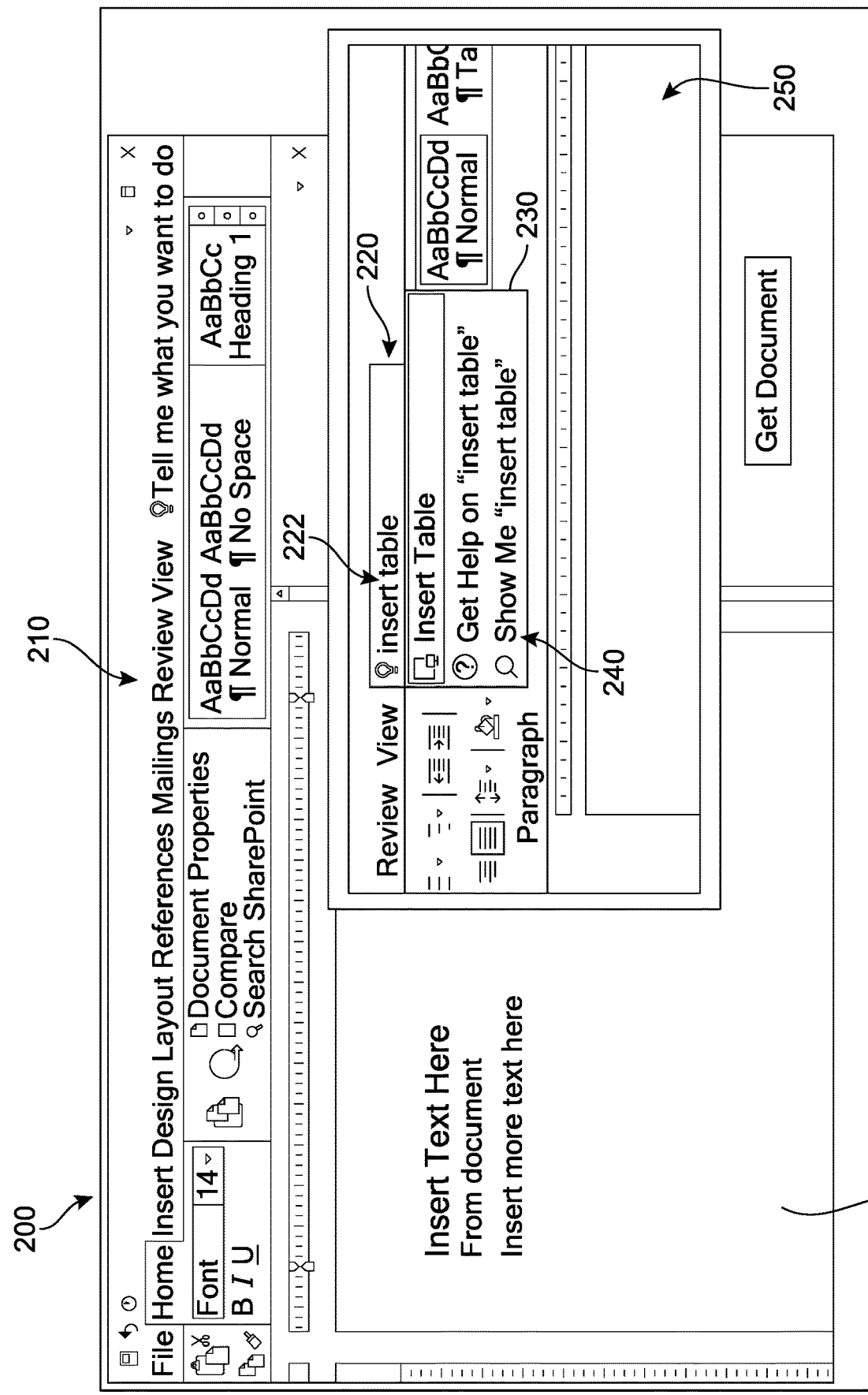
FIG. 2 is a display diagram illustrating an implementation of a first application and a search feature in the first application.

For purposes of clarity, an example of the inter-app messaging mechanism or "cross-linking" mechanism is depicted in the sequence of FIGS. 2-5. Referring first to FIG. 2, an implementation of a display 200 for a computing device is illustrated. In different implementations, the display 200 may present various icons, interfaces, graphics, applications, or other device status information. As an example, the display 200 includes a first application 210. For purposes of simplicity, the first application 210 in FIG. 2 is a word processor program displaying a document page 212. In one implementation, first application 210 may be understood to represent a version of Microsoft Word®, or another word processing program, such as Apple Pages®, Corel WordPerfect®, Google Docs®, IBM Lotus Word Pro® and other word editing programs. However, in other implementations, the first application 210 may include any other software applications within the Microsoft Office Suite® or array of Microsoft® products as well as any non-Microsoft® based applications.

During various user interactions with the first application 210, the first application 210—either as originally installed or updated—may offer the user an opportunity to explore or learn about a particular feature or set of features available to the user. As noted earlier, the opportunity may be displayed or otherwise provided to the user in response to a triggering event. Referring to a magnified view 250 of FIG. 2, the user has navigated to a first taskbar 220 and entered a search query ("query") 222 regarding an ability to insert a table into the document page 212. For purposes of simplicity, the search query "insert a table" will be understood to refer to the concept of creating a structured format (for example, a series of worksheet rows and columns) for the purposes of displaying and storing related data.

In the example of FIG. 2, in response to the user's query, the first application 210 is displaying a drop-down menu ("menu") 230, listing a plurality of options that may be related to the user's query. For purposes of illustration, a first option 240 is included near a lower end of the menu 230, and is labeled 'Show Me "insert a table"'. In other implementations, any other alphanumeric text or graphics may be displayed in conjunction with the query. In different implementations, a user may choose, click, or otherwise select the first option 240. In some implementations, this action will be interpreted by the first application 210 as a triggering event.

A client device can be configured to receive packages from the service or package server as well as monitor the client system for events that trigger cross-linked messages. As one example, when a triggering event occurs and is detected, a messaging client can merge the asset with the native control and display a resulting "targeted control" in a user interface to the application. For purposes of this application, a targeted control is formed by combination of an existing native control with a specific asset provided in the package. The targeted control can be displayed with or incorporated in a user interface in the application.

Figure 3:
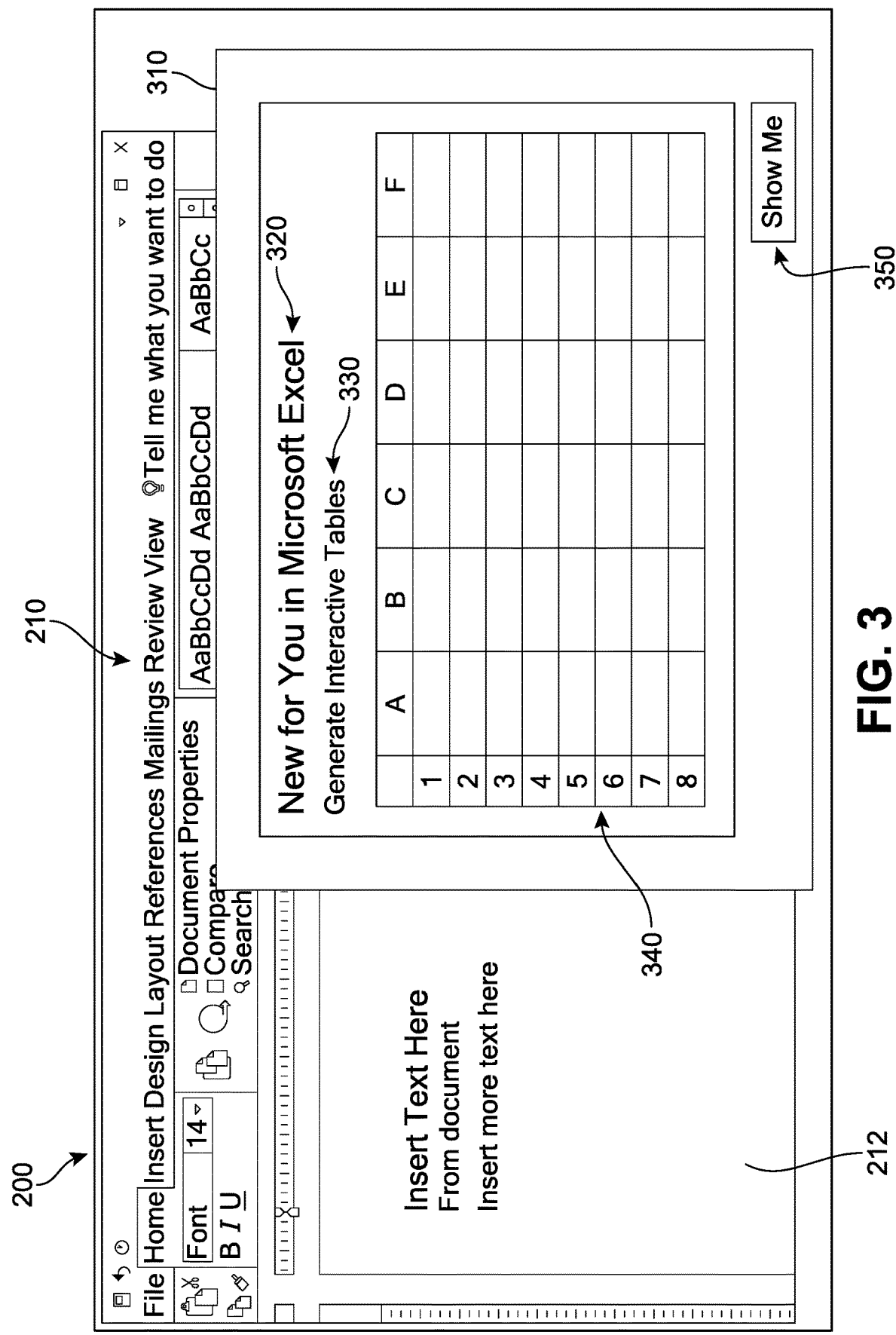
FIG. 3 is a display diagram illustrating an implementation of the first application and a dialog box guiding a user to a first feature available in a second application.

In this case, the targeted control comprises a graphical UI (GUI). Referring now to FIG. 3, it can be seen that in some implementations, the triggering event can elicit the display of a native control, such as a targeted control. The GUI presented is a small pop-up window or a dialog box, herein referred to as a first dialog window ("first dialog") 310. As shown in the example of FIG. 3, the first dialog 310 is overlaid on the first application's interface. The specific location represented in FIG. 3 is intended to underscore the relationship of the message of the first dialog 310 with the first application 210. However, it should be understood that in other implementations, the first dialog 310 may be displayed or generated anywhere else on the screen(s) associated with the client's system, including spaced apart from or behind the first application 210.

In different implementations, the first dialog 310 can include information related to the user's query (see FIG. 2), including but not limited to a listing of one or more potential productivity or other software applications that may be utilized to provide the user with the desired tool or outcome as understood or interpreted by the system. In one implementation, the first dialog 310 includes a listing or other representation of one or more tools or features that are available in at least another, second application, where the second application is distinct and/or differs from the first application 210. Such a listing can include tools that have been determined to be related to or associated with the user's query. In this example, the first dialog 310 includes a notification header 320, a tool overview 330, a graphical representation 340, and an interactive button 350. In other implementations, one or more of these features may be omitted, and/or additional features may be included.

In FIG. 3, the optional notification header 320 includes the text "New For You in Excel", identifying the tool provided in the first dialog 310 as being a new feature recently added to the second application and/or a feature that the user may not have accessed previously on this system. The term "Excel" in this example may be understood to refer to a spreadsheet program, such as Microsoft Excel®, OpenOffice Calc®, Apple Numbers®, Google Sheets®, Corel Quatro®, and other such spreadsheet productivity applications. However, in other implementations, the suggested tool may refer to any other software application within the Microsoft Office Suite® or array of Microsoft® products as well as any non-Microsoft® based applications.

In some implementations, the first dialog 310 can include the optional tool overview 330, providing an introduction or summary of the recommended feature or tool. In addition, in some implementations, the first dialog 310 may also include an optional graphical representation 340 with an illustration showcasing the application, the specific tool, and/or a teaching image. In other implementations, the graphic can include images such as photographs, schematics, tutorial overviews, screenshots, photos, slideshow, video, audio, and other such content or second application-related asset(s). In some implementations, larger files such as video or slideshows can be provided to the user as needed or requested, and can be downloaded or streamed independently of the package.

The interactive button 350 may be understood to offer a user an opportunity for a user to obtain additional information or be directed to the recommended feature associated with the second application. In some implementations, the interactive button 350 may be associated with a deep link, as discussed above. The deep link can be configured to transport the user to a destination that is specifically correlated to the type of triggering event that has occurred.

In some implementations, the dialog can be minimized or closed if a user does not choose to proceed. However, if a user clicks the interactive button 350 (here presented with the text "Show Me") or otherwise chooses to proceed with the offered tool, the system may automatically open and/or display the second application as determined by the corresponding deep link. In some implementations, the first dialog 310 may then close or minimize, though in other implementations the first dialog 310 may remain displayed while the second application is presented. It should be understood that in some implementations, the dialog box may not be presented and the user may be more directly or immediately provided with access to a second, different application. For example, a user may adjust the system settings to automatically open the second application and direct the user to the recommended features or tools rather than first displaying a Show Me-type box when a triggering event occurs. In another example, the system may instead minimize the first application and highlight a shortcut or other path to opening or accessing the second application, and/or a highlighted or walkthrough process for navigating to the specific feature or tool, allowing or encouraging the user to more actively participate and learn how to independently access the application.

Figure 4:
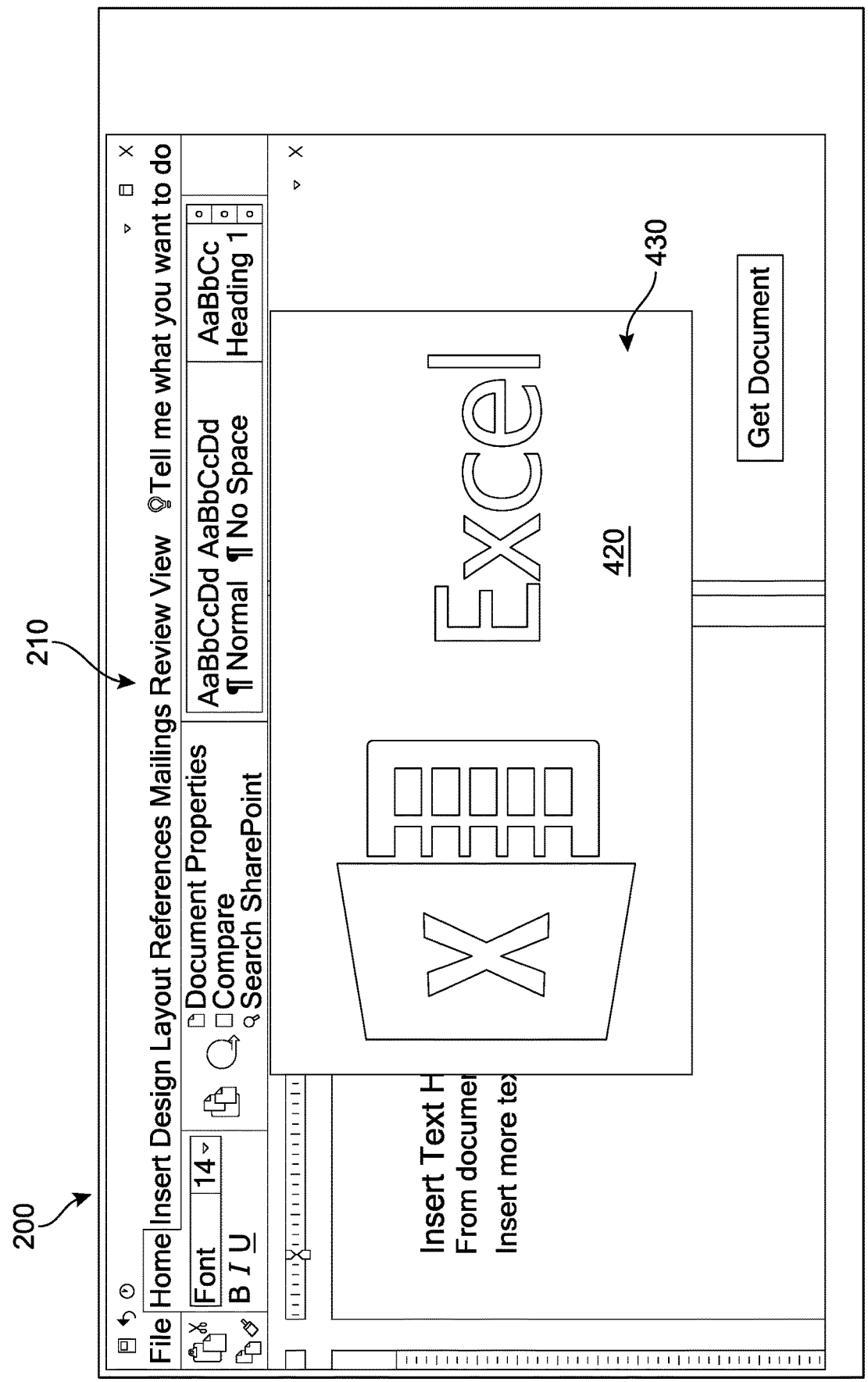
FIG. 4 is a display diagram illustrating an implementation of a second application being opened in response to a trigger generated through the first application.

Referring next to FIG. 4, the first application 210 remains available (though in other examples, the first application 210 may be minimized, overlaid, temporarily closed, or otherwise repositioned on the display) while a second application 420 is initialized, loaded, launched, opened, or started, as represented by a splash screen 430. In other implementations where the second application has been previously opened and/or is for any reason presently running on the system, or in cases where the splash screen has been disabled or is not available, the step of FIG. 4 may be skipped or omitted and the second application 420 program may be more immediately or directly presented to the user (see FIG. 5).

Figure 5:
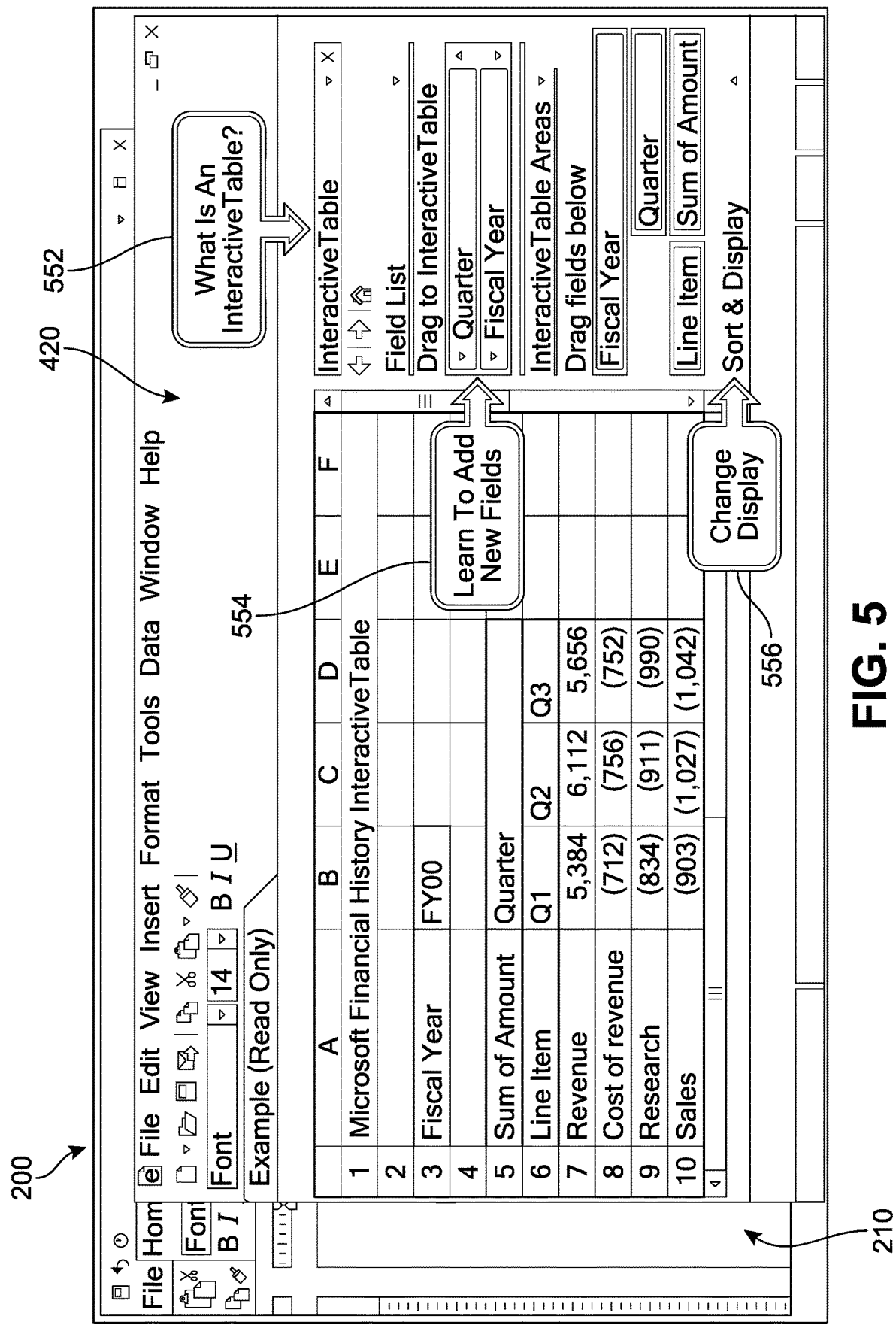
FIG. 5 is a display diagram illustrating an implementation of the second application with the first feature being showcased.

In FIG. 5, a second application 420 is now available. In this example, the second application 420 is a spreadsheet program. Thus, the search query entered via the first application 210 has led to the presentation, display, or opening of a second, different application. This type of cross-linking between applications can facilitate the education or training of a user with respect to tools that are available to them, and provide easily accessible avenues that can help increase user productivity.

Furthermore, in some implementations, the displayed content in the second application 420 can be directly related or associated with the feature. In other words, the cross-linking mechanism may be configured to navigate substantially directly from the first application to an aspect of the second application 420 that highlights, launches, or showcases the specific tool or feature of the second application 420 that was identified in the first dialog 310 of FIG. 3. Thus, in one implementation the content displayed following the step shown in FIG. 3 will include an opportunity or direct access to the targeted tool, without the need for further user input or navigation to ensure the arrival at such a destination.

In addition, in one implementation, the system may provide teaching callouts. For example, in FIG. 5, the second application 420 has opened and displays educational content comprising a tutorial. The tutorial can include any content, message, information, images, or assets related to the specific feature. In this case, the tutorial includes a first step 552, a second step 554, and a third step 556. In some implementations, these steps may be interactive or "live" for access and use in real-time with user selected or user entered data. It should be understood that these steps are provided for illustration purposes only and any other steps or interface can be displayed, including fewer or additional steps. Furthermore, in some implementations, the tutorial may comprise a series of sequential steps that are presented one at a time, such that a user clicks or moves through the sequence as each step is reviewed or executed.

In different implementations, the tutorial can provide the user with options for real-time or active use of the offered tool, though in other implementations, the tutorial can provide a passive introduction or guide to the use of the tool. Thus, in one implementation, one or more of the steps can be interactive, and a user can click on each step and enter data or file names or other information and be prompted with additional steps or guidance to enable ease of understanding and quick application of the feature(s). In other implementations, the tutorial may include an audio and/or video file that helps the user appreciate the functions, benefits, and/or range of options associated with the tool, as well as guidance on its native controls. For example, in productivity applications, the deep link can provide navigation to a specific ribbon location, and/or provide guidance on short-cuts or other features. In some cases, a package may include more than one deep link, such that a first deep link can link to a first feature and the second deep link can link to a second feature, where the second feature is only available to select users or licenses. Depending on the system metadata, the application may navigate to either the first deep link page or the second deep link page. In some implementations, the user may be informed that the deep link provides access to a feature that is currently unavailable and may be given an opportunity to download or otherwise access the selected feature. In other cases, the package may include a plurality of deep links that are individually, sequentially, and/or collectively activated when one or more criteria are met, specified thresholds are crossed, and/or triggering events are detected. Such activity may be logged and shared with the network to inform future package updates or downloads.

Figure 6:
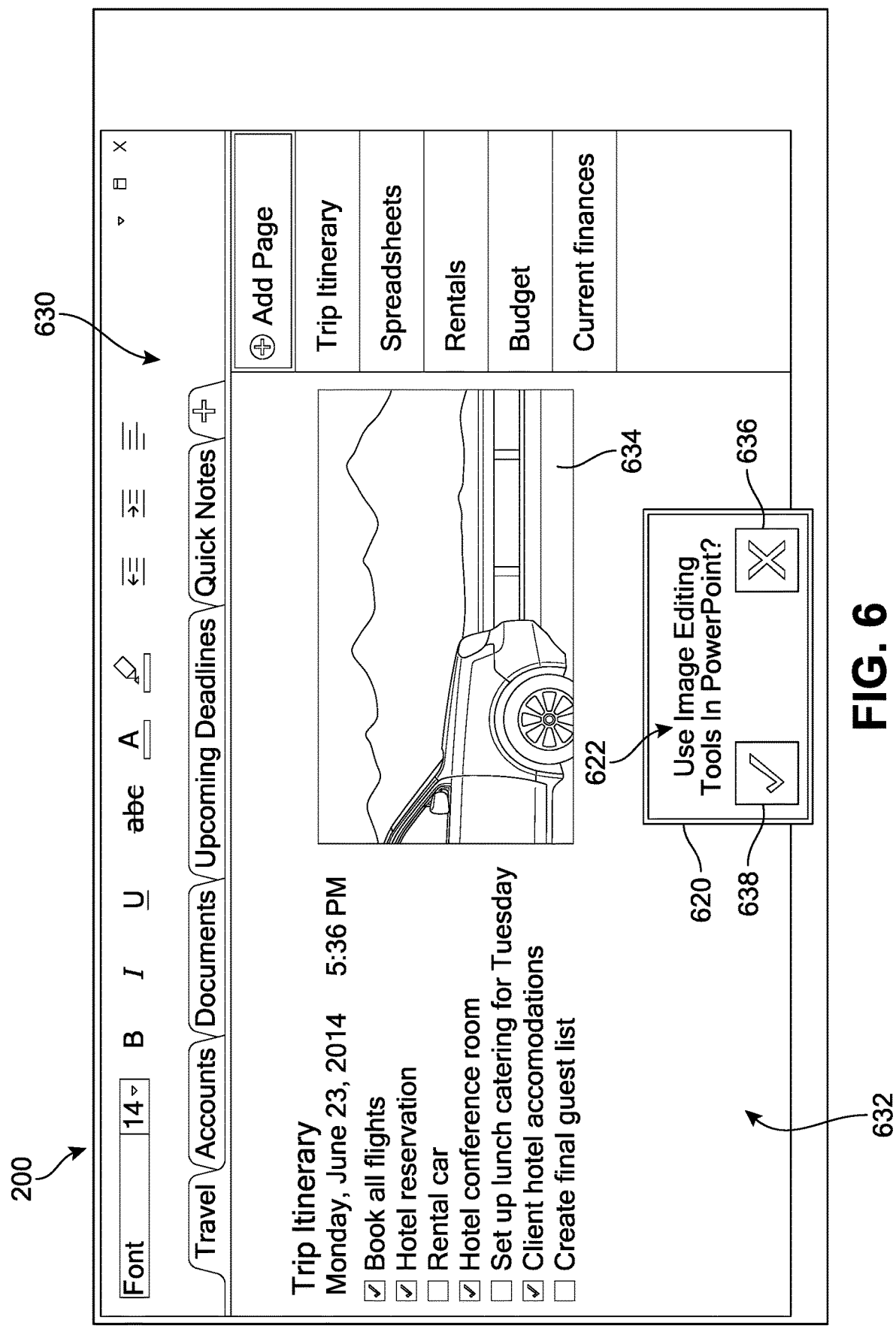
FIG. 6 is a display diagram illustrating an implementation of a third application being used to manipulate a set of data and a dialog box guiding a user to a second feature available in a fourth application.
Figure 7:
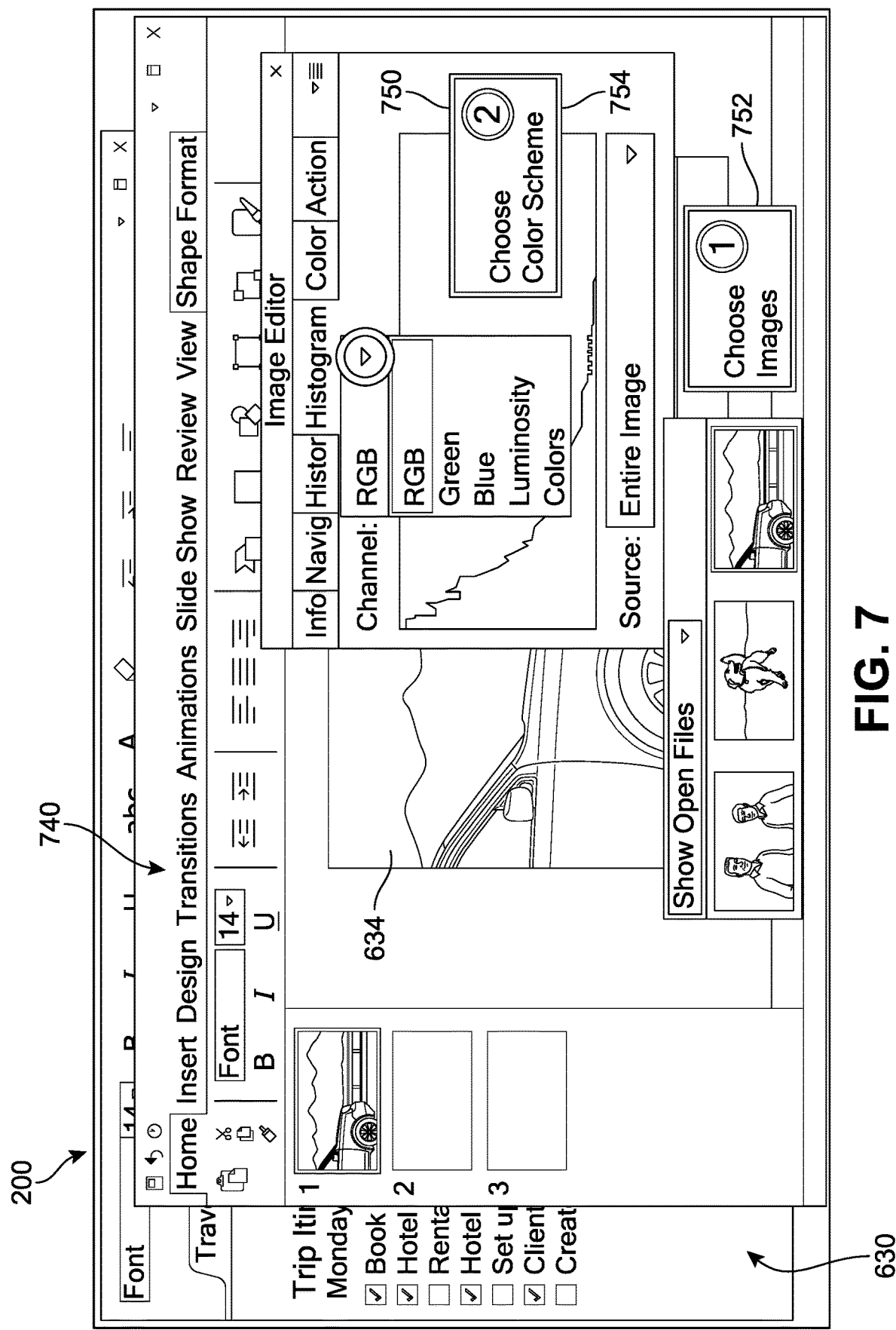
FIG. 7 is a display diagram illustrating an implementation of the fourth application with the second feature being showcased along with the set of data.

The mechanisms, systems, and methods described herein may include provisions for increasing the efficiency and functionality of a new tool by providing additional transitional or bridging options between the two applications. One example of such a provision is illustrated in FIGS. 6 and 7. In FIG. 6, the display 200 shows a third application 630. For purposes of simplicity, the third application 630 in FIG. 6 is a digital note-taking application or a digital notebook application. In one implementation, the third application 630 may be understood to represent a version of Microsoft OneNote®, or another digital note-taking program, such as Apple Penultimate®, Evernote®, Google Keep®, and other note-keeping or note editing programs. However, in other implementations, the third application 630 may include any other software applications within the Microsoft Office Suite® or array of Microsoft® products as well as any non-Microsoft® based applications.

The third application 630 includes a note-page 632, and, among other things, an image 634. In some implementations, the third application 630 or other components of the client system may detect or otherwise identify a pattern of usage ("usage pattern"), telemetry, or user device behavior that can correspond to a triggering event. As an example, a triggering event may include attempts by the user to interact or modify the image 634 in the third application 630. The system may identify the attempts as including a first usage pattern or a specific event that indicates or suggests that the user is seeking to edit, enhance, or transform the image 634. Thus, in some implementations, the first package associates a first usage pattern with a first triggering event and specifies at least a first native control to invoke in response to the first triggering event. The system can be configured to determine, during use of the first native application, that the first triggering event has occurred based on a detected occurrence of the first usage pattern. In response to such a determination, the third application 630 may present or display a native control, such as a user interface element or GUI. In this case, the GUI presented is a small pop-up window or a dialog box, herein referred to as a second dialog window ("second dialog") 620. As shown in the example of FIG. 6, the second dialog 620 is overlaid on the third application's interface. The specific location represented in FIG. 6 is intended to underscore the relationship of the message of the second dialog 620 with the third application 630. However, it should be understood that in other implementations, the second dialog 620 may be displayed or generated anywhere else on the screen(s) associated with the client's system, including spaced apart from or behind the third application 630.

In different implementations, the second dialog 620 can include information related to the behavior, actions, or events corresponding to the triggering event. This information may include but is not limited to a listing of one or more potential productivity or other software applications that may be utilized to provide the user with the desired tool or outcome as understood or interpreted by the system. In one implementation, the second dialog 620 includes a listing or other representation of one or more tools or features that are available in at least another, fourth application, where the fourth application is distinct and/or differs from the third application 630. Such a listing can include tools that have been determined to be related or associated with the user's usage pattern or telemetry. In this example, the second dialog 620 includes a notification header 622, a first interactive button 636 and a second interactive button 638. In other implementations, one or more of these aspects may be omitted, and/or additional aspects may be included. In some implementations, the first native application is configured to invoke the first native control which is displayed or presented in the form of a first user interface element. This user interface element can allow navigation to a specific "first feature" of a second native application, as will be discussed below.

In FIG. 6, the optional notification header 622 includes the text "Use Image Editing Tools in Powerpoint?" identifying a feature of the fourth application as being a potentially useful tool to the user. The term "PowerPoint" in this example may be understood to refer to a presentation program, such as Microsoft PowerPoint®, OpenOffice Impress®, Apple Keynote®, Google Slides®, Prezi® and other such presentation productivity applications. However, in other implementations, the suggested tool may refer to any other software application within the Microsoft Office Suite® or array of Microsoft® products as well as any non-Microsoft® based applications.

In some other implementations, the second dialog 620 can include an optional tool overview, providing an introduction or summary of the recommended feature or tool. In addition, in some implementations, the second dialog 620 may also include an optional graphical representation with an illustration showcasing the application, the specific tool being promoted, and/or a teaching-type image. In other implementations, the graphic can include images such as photographs, schematics, tutorial overviews, screenshots, photos, slideshow, video, audio, and other such content or second application-related asset(s).

The second interactive button 638 may be understood to offer a user an opportunity for a user to obtain additional information or be directed to the recommended feature associated with the fourth application, while the first interactive button 636 can close the second dialog 620. In one implementation, additional interactive buttons may provide options to learn more about the suggested tool(s). In some implementations, the second interactive button 638 may be associated with a "deep link" as discussed above. The dialog can be minimized or closed if a user does not choose to proceed. However, if a user clicks the second interactive button 638 (here presented with a check mark, though in other implementations the button may include any other alpha-numeric or graphical elements) or otherwise chooses to proceed with the offered tool, the system may open and/or display the fourth application. In some implementations, the second dialog 620 may also close or minimize or be repositioned on the display, though in other implementations the second dialog 620 may remain displayed while the fourth application is presented. Thus, the system may receive a first user input indicating a selection of the first user interface element that corresponds to acceptance of the offered tool or guidance.

In some implementations, in response to receiving the first user input, the system is configured to automatically navigate to the first feature of the second native application. Referring now to FIG. 7, the third application 630 remains available (though in other examples, the third application 630 may be minimized, overlaid, closed, or otherwise shifted) while a fourth application 740 is initialized, loaded, launched, opened, or started. In this example, the fourth application 740 is a presentation program. In some implementations, the third application 630 can cross-link to the fourth application 740. As noted above, this type of cross-linking between applications can facilitate the education or training of a user with respect to tools that are available to them, and provide easily accessible avenues that can help increase user productivity.

Furthermore, in some implementations, the displayed content in the fourth application 740 can be directly related or associated with the feature suggested during use of the third application. In other words, the cross-link mechanism may be configured to navigate substantially directly from the third application to an aspect of the fourth application 740 that highlights, launches, or showcases the specific tool or feature of the fourth application 740 that was identified in the second dialog 620 of FIG. 6. Thus, in one implementation the content displayed following the step shown in FIG. 6 will include an opportunity for direct access to the targeted tool, without the need for further user input or navigation to ensure the arrival at such a destination. For example, in FIG. 7, the fourth application 740 has opened a teaching callout or walkthrough assistant 750. The walkthrough assistant 750 can include any content, message, information, images, or assets related to the specifically recommended feature, and may further include multiple information or dialog windows. In this case, the walkthrough assistant 750 includes a first step 752 and a second step 754. It should be understood that these steps are provided for illustration purposes only and any other steps or interface can be displayed, including fewer or additional steps. Furthermore, in some implementations, the walkthrough assistant 750 may comprise a series of sequential steps that are presented one at a time, such that a user clicks or moves through the sequence as each step is reviewed or executed. In FIG. 7, the system has specifically navigated to an Image Editor tool of the fourth application 740. The first step 752 allows a user to select one or more images that had been used in the third application, and the second step 754 presents a drop down menu suggesting various options to edit or analyze the image(s), as well as a menu with additional image editing options.

In different implementations, the walkthrough assistant 750 can provide the user with options for real-time or active use of the offered tool, though in other implementations, the walkthrough assistant 750 can provide a passive introduction or guide to the use of the tool. Thus, in one implementation, one or more of the steps can be interactive, and a user can click on each step and enter data or file names or other information and be prompted with additional steps or guidance to enable ease of understanding and quick application of the feature. In other implementations, the walkthrough assistant 750 may include an audio and/or video file that helps the user appreciate the functions, benefits, and/or range of options associated with the tool, as well as guidance or on its native controls.

As noted earlier, in some implementations, various data or other information can be relayed, communicated, transferred, shared, and/or copied from one application to another application. In one implementation, the walkthrough assistant 750 can include guidance or instructions on how to edit the image or data as desired. In other words, with minimal user intervention, the two applications can be configured to automatically share information and more effectively provide the service or tools across applications, thereby improving a user's experience and proficiency. This is illustrated in FIG. 7, where in some implementations, the third application 630 can be configured to automatically share some portion or all of any data (here, image 634) that was being manipulated via the third application 630 and was determined to be associated with or contributing to the triggering event. Furthermore, the fourth application 740 can be configured to automatically receive or incorporate data that has been shared between the applications. In this case, the image 634 has been automatically copied and/or moved and is now inserted or otherwise available within the fourth application 740. In some other implementations, a permission interface or dialog box may first be presented to the user to confirm or ask if they would like the system to transfer some or all of the data currently entered in the open file of the third application 630 to the fourth application 740. In some cases, the user may be able to specify which data, file, folder, or other segment of information to automatically transfer to the fourth application 740. Additional opportunities can also be made available to the user to automatically bring various portions of data from one application into a second, different application. In some implementations, the finished or manipulated product of the fourth application 740 can be transferred or returned to the third application 630 at any stage of the use of either application. In one implementation, this transfer of data back to the third application 630 can be accomplished manually or there may be a 'shortcut' option available that automatically carries the work of the fourth application 740 into the third application 630. In other words, the two applications can in some cases cooperate or communicate to enable a user access to tools across both applications while working on the same project. For purposes of this disclosure, the term "project" refers to an enterprise or undertaking generally designed to achieve a particular aim for which a user is utilizing the software application(s).

Thus, in different implementations, a user can fluidly and efficiently learn to apply the tools offered via the fourth application 740 and produce the results desired using their own data, rather than being limited to trial data or passive tutorials. The features described herein can allow a user to train and become proficient in new features while also continuing to work on their target project, reducing obstacles to the user's implementation of the new features, increasing accessibility to the array of tools offered through the applications, and simplifying the mastery of skills.

It should be understood that although only two applications are cross-linked in the above examples, three or more applications may also be cross-linked. In other words, a first application and a second application may be cross-linked, and the second application and a third application (and other applications) may be further cross-linked, thereby enabling third application access to the data of the first application as well. Similarly, a first application and a second application may be cross-linked, and the first application may further be cross-linked to a third, fourth, fifth or any number of other applications. Thus, as an example, if a user is actively working in a first application and learns (through implementations provided herein) of features in a second application and elects to cross-link to the second application, the user may further opt to train in new features offered by a third application and cross-link from the second application to the third application.

Although in some implementations a user may engage in behavior or tasks that directly correlate or correspond to a triggering event, it should be understood that the context for various trigger events may be larger or more generic. For example, the system may be configured to more broadly identify a user type that would be interested in a particular feature, or a pattern of usage ("usage pattern") that may indicate an intent to utilize such features either presently or in the future. In one implementation, a system may also assess a user's actions outside of the client device and across multiple devices where a user has logged in or accessed their account to determine whether a triggering event has occurred. In some implementations, the number of 'clicks' a user makes before arriving at a specific feature or destination, the text being typed into a document or application, application versions, local metadata, user preferences, the product licenses available to the client system, the options or settings preferred by a user, the text being highlighted or searched on a browser or other search engine, the amount of time (duration) a user spends on one application and/or on a particular task, the types of Help searches made by the user, the user's activity across two or more applications, and/or the number of times or frequency a user engages in a specific activity, as well as information related to the user's activity or account credentials may be evaluated when determining the occurrence of a triggering event. In one implementation, the system may determine whether a package deployment was successful by recording the frequency of any subsequent utilization of the advertised feature or requesting customer feedback. Such usage history can further guide the types of packages that are delivered and/or deployed for a specific user.

In some implementations, the user action(s) or pattern may include a workflow that can indicate or be associated with an intent of the user to activate a feature of a productivity application. The feature may include a previously unused feature of the application, as described above, as well as underutilized features, and/or a feature that may not have been known as being useful for a particular data type, among others. The various components of the environment 150 as described in FIG. 1 may be configured to recognize a trait or pattern of traits associated with the user. In some implementations, there may be a productivity service module configured to collect information related to the determination of triggering events, though in other implementations, the package(s) may be configured to do so internally. These traits may include a user credential, a context associated with the user, and/or the opening of applications often accessed by the user, or other such information as described herein. For example, a content associated with a feature of a productivity application that has been identified as useful for a cross-linked presentation in a teaching interface based on the user type and actions may be offered to the user. As described herein, the content may include a video stream, an audio stream, and/or a presentation, or other guidance, in some cases with steps describing how to use the feature. The package service may provide the content in the teaching interface for a presentation on the features of the second productivity application.

Figure 8:
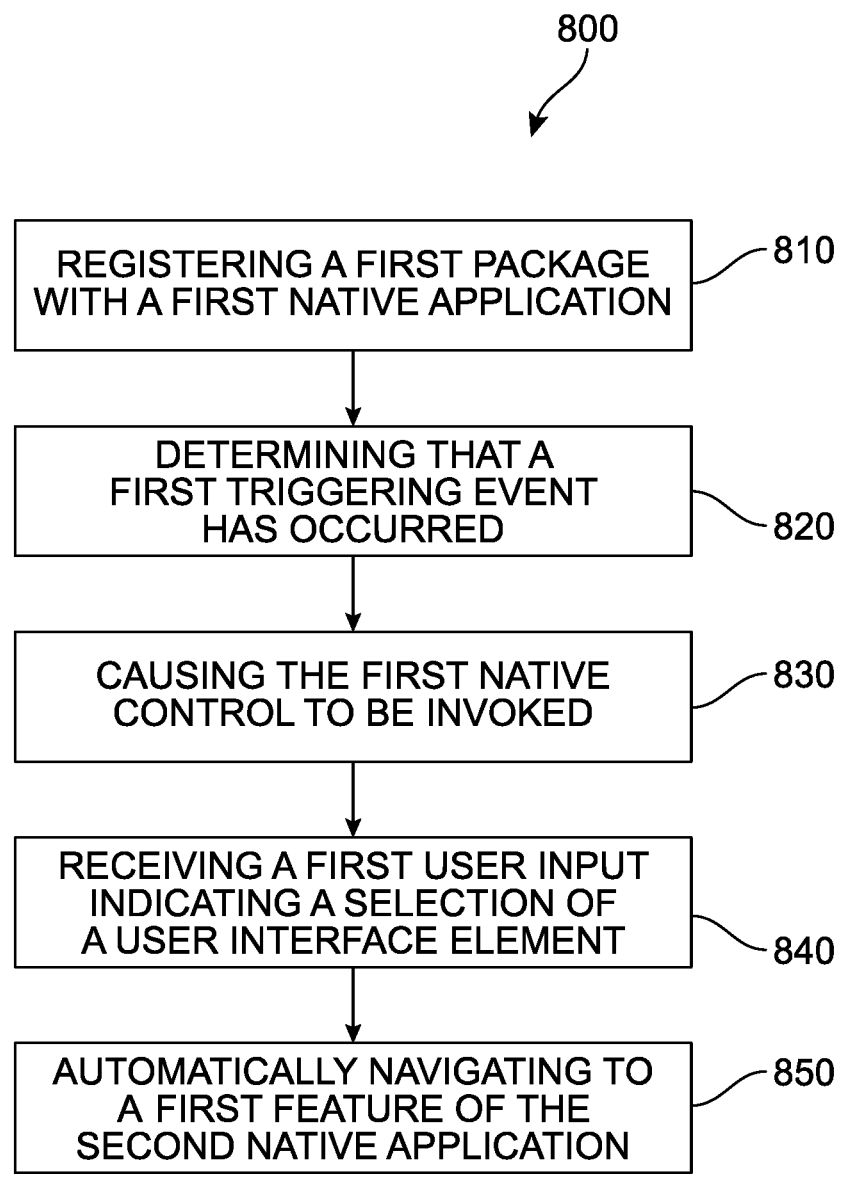
FIG. 8 is a logic flow diagram illustrating an implementation of a process for cross-linking applications.

Referring now to FIG. 8, a flow chart illustrating an implementation of a method 800 of providing a cross-linked message in a computing device is depicted. In FIG. 8, it may be seen that a first step 810 includes registering a first package with a first native application. In different implementations, the first package can associates a first usage pattern with a first triggering event. Furthermore, the first package can specify at least a first native control to invoke in response to the first triggering event. A second step 820 includes determining, during use of the first native application, that the first triggering event has occurred based on a detected occurrence of the first usage pattern. In response to the determination that the first triggering event has occurred, the method can include causing the first native application to invoke the first native control which presents a first user interface element allowing navigation to a first feature of a second native application in a third step 830. A fourth step 840 involves receiving a first user input indicating a selection of the first user interface element. In response to receiving the first user input, the method includes automatically navigating to the first feature of the second native application the first input. This can occur through a first deep link provided in the first package.

In other implementations, additional steps may be included. For example, another step may include automatically presenting, in response to receiving the first user input, a first educational content that describes use of the first feature of the second native application. In another example, the method may include registering a second package with the first native application. In this case, the second package can associate a second usage pattern with a second triggering event and specify at least a second native control to invoke in response to the second triggering event. The method may further include determining, during use of the first native application, that the second triggering event has occurred based on a detected occurrence of the second usage pattern, and in response to the determination that the second triggering event has occurred, causing the first native application to invoke the second native control which presents a second user interface element allowing navigation to a second feature of a third native application, receiving a second user input indicating a selection of the second user interface element, and in response to receiving the second user input, automatically navigating to the second feature of the third native application via a deep link included in the second package.

In another example, the method can involve registering a second package with the first native application, where the second package associates a second usage pattern with a second triggering event and specifies at least a second native control to invoke in response to the second triggering event. In this case, the method also can include determining, during use of the first native application, that the second triggering event has occurred based on a detected occurrence of the second usage pattern, and in response to the determination that the second triggering event has occurred, causing the first native application to invoke the second native control which presents a second user interface element allowing navigation to a second feature of the second native application, as well as receiving a second user input indicating a selection of the second user interface element and, in response to receiving the second user input, automatically navigating to the second feature of the second native application via a deep link included in the second package.

In some implementations, the method may include automatically transmitting user-inputted data from the first native application to the second native application. In one implementation, the first feature is not available in the first native application. In another implementation, the first package includes instructions for the first native application and the second native application. As noted previously, in some implementations, the presentation of the first user interface element may occur while the computing device is in an offline mode. In addition, in some implementations, the first user interface element includes educational content associated with telemetry of the first usage pattern corresponding to the first triggering event. As another example, the native control(s) can include a graphical user interface that is associated with a tutorial. Other steps and features described herein may also be included in the method in different implementations.

The detailed examples of systems, devices, and techniques described in connection with FIGS. 1-8 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-8 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 9:
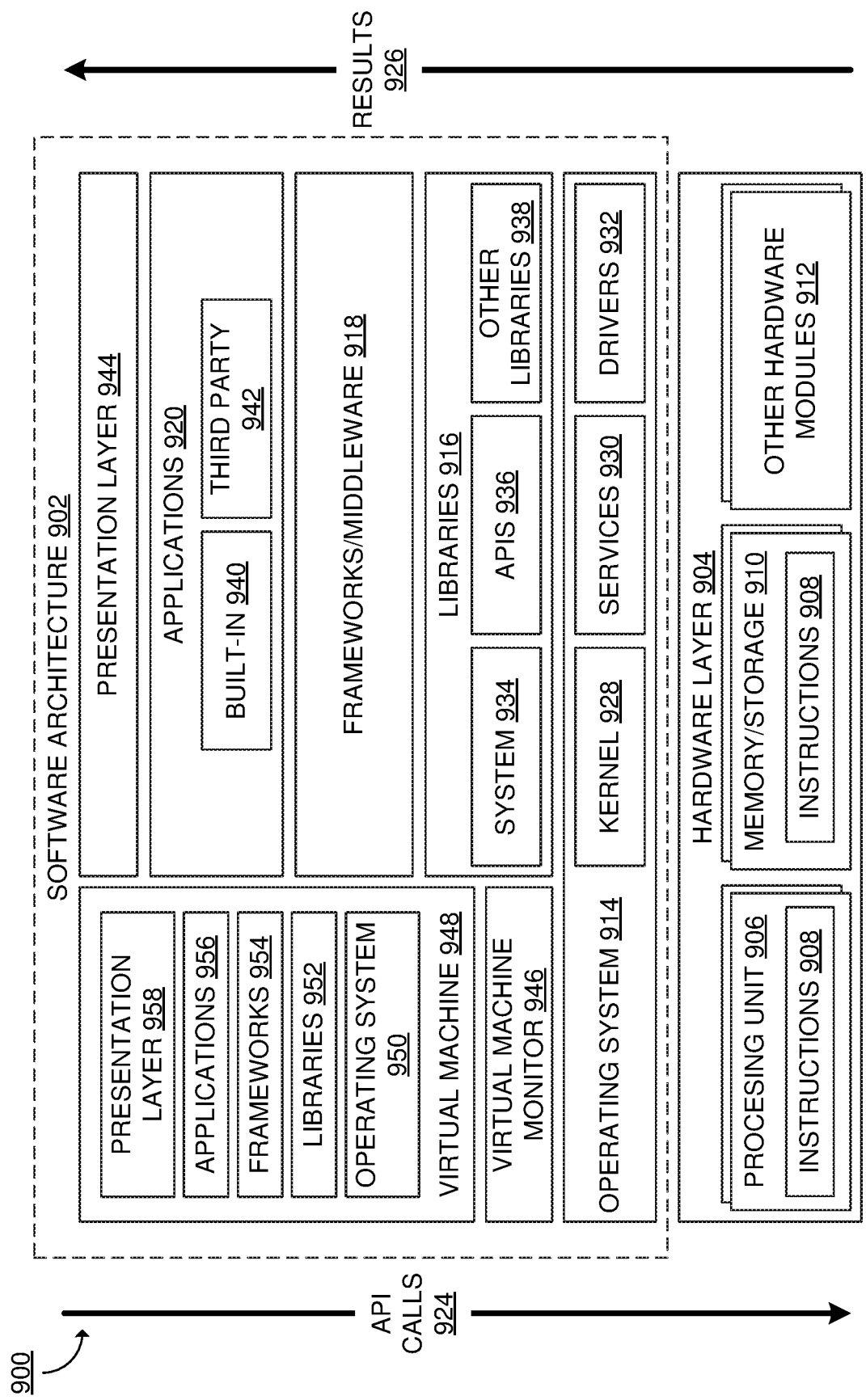
FIG. 9 is a block diagram of an example computing device, which may be used to provide implementations of the mechanisms described herein.

FIG. 9 is a block diagram 900 illustrating an example software architecture 902, various portions of which may be used in conjunction with various hardware architectures herein described, which may implement any of the above-described features. FIG. 9 is a non-limiting example of a software architecture and it will be appreciated that many other architectures may be implemented to facilitate the functionality described herein. The software architecture 902 may execute on hardware such as a machine 1000 of FIG. 10 that includes, among other things, processors 1010, memory 1030, and input/output (I/O) components 1050. A representative hardware layer 904 is illustrated and can represent, for example, the machine 1000 of FIG. 10. The representative hardware layer 904 includes a processing unit 906 and associated executable instructions 908. The executable instructions 908 represent executable instructions of the software architecture 902, including implementation of the methods, modules and so forth described herein. The hardware layer 904 also includes a memory/storage 910, which also includes the executable instructions 908 and accompanying data. The hardware layer 904 may also include other hardware modules 912. Instructions 908 held by processing unit 908 may be portions of instructions 908 held by the memory/storage 910.

The example software architecture 902 may be conceptualized as layers, each providing various functionality. For example, the software architecture 902 may include layers and components such as an operating system (OS) 914, libraries 916, frameworks 918, applications 920, and a presentation layer 944. Operationally, the applications 920 and/or other components within the layers may invoke API calls 924 to other layers and receive corresponding results 926. The layers illustrated are representative in nature and other software architectures may include additional or different layers. For example, some mobile or special purpose operating systems may not provide the frameworks/middleware 918.

The OS 914 may manage hardware resources and provide common services. The OS 914 may include, for example, a kernel 928, services 930, and drivers 932. The kernel 928 may act as an abstraction layer between the hardware layer 904 and other software layers. For example, the kernel 928 may be responsible for memory management, processor management (for example, scheduling), component management, networking, security settings, and so on. The services 930 may provide other common services for the other software layers. The drivers 932 may be responsible for controlling or interfacing with the underlying hardware layer 904. For instance, the drivers 932 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 916 may provide a common infrastructure that may be used by the applications 920 and/or other components and/or layers. The libraries 916 typically provide functionality for use by other software modules to perform tasks, rather than rather than interacting directly with the OS 914. The libraries 916 may include system libraries 934 (for example, C standard library) that may provide functions such as memory allocation, string manipulation, file operations. In addition, the libraries 916 may include API libraries 936 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 916 may also include a wide variety of other libraries 938 to provide many functions for applications 920 and other software modules.

The frameworks 918 (also sometimes referred to as middleware) provide a higher-level common infrastructure that may be used by the applications 920 and/or other software modules. For example, the frameworks 918 may provide various graphic user interface (GUI) functions, high-level resource management, or high-level location services. The frameworks 918 may provide a broad spectrum of other APIs for applications 920 and/or other software modules.

The applications 920 include built-in applications 940 and/or third-party applications 942. Examples of built-in applications 940 may include, but are not limited to, a contacts application, a browser application, a location application, a media application, a messaging application, and/or a game application. Third-party applications 942 may include any applications developed by an entity other than the vendor of the particular platform. The applications 920 may use functions available via OS 914, libraries 916, frameworks 918, and presentation layer 944 to create user interfaces to interact with users.

Some software architectures use virtual machines, as illustrated by a virtual machine 948. The virtual machine 948 provides an execution environment where applications/modules can execute as if they were executing on a hardware machine (such as the machine 1000 of FIG. 10, for example). The virtual machine 948 may be hosted by a host OS (for example, OS 914) or hypervisor, and may have a virtual machine monitor 946 which manages operation of the virtual machine 948 and interoperation with the host operating system. A software architecture, which may be different from software architecture 902 outside of the virtual machine, executes within the virtual machine 948 such as an OS 950, libraries 952, frameworks 954, applications 956, and/or a presentation layer 958.

Figure 10:
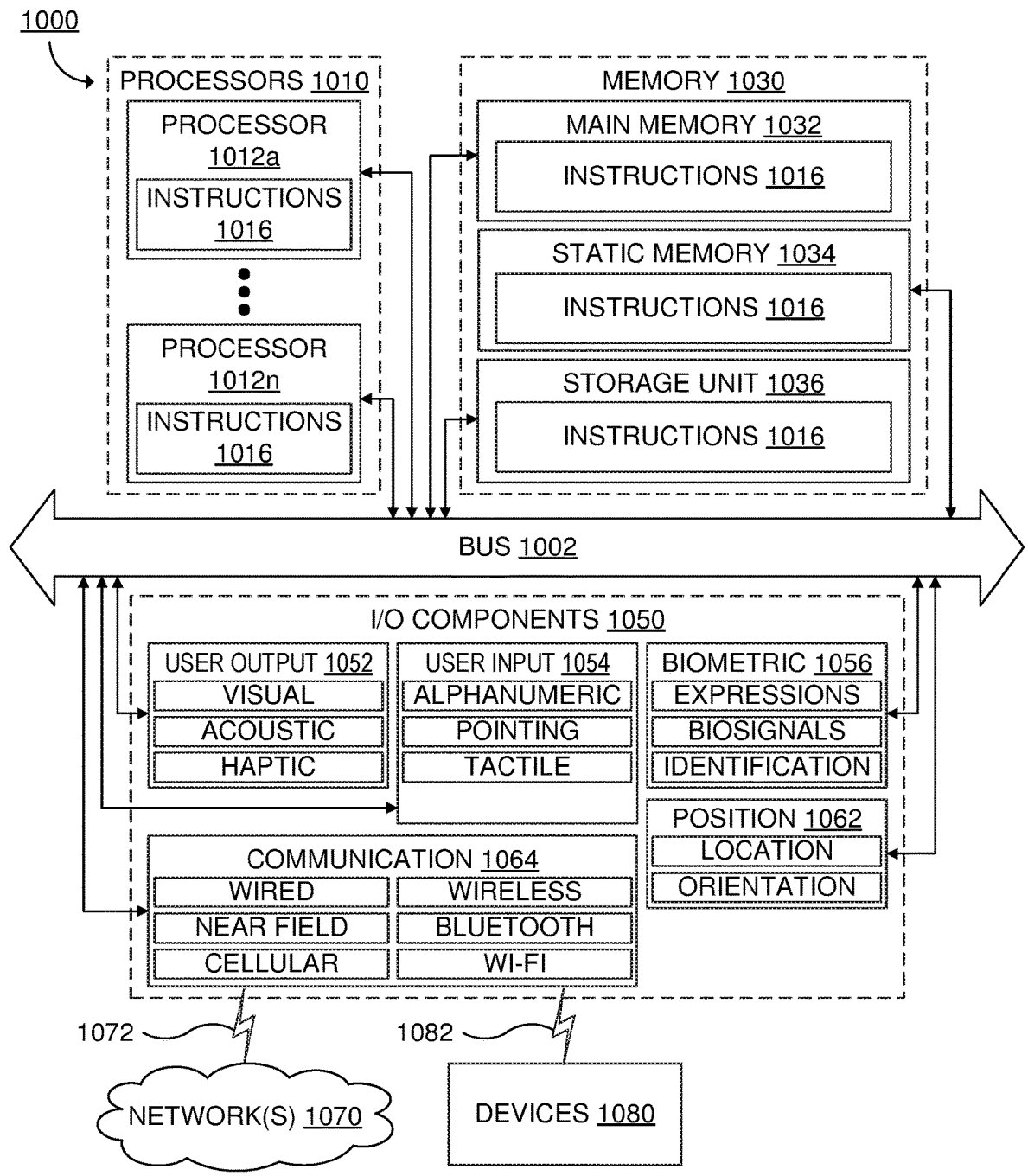
FIG. 10 is a block diagram illustrating components of an example machine configured to read instructions from a machine-readable medium.

FIG. 10 is a block diagram illustrating components of an example machine 1000 configured to read instructions from a machine-readable medium (for example, a machine-readable storage medium) and perform any of the features described herein. The example machine 1000 is in a form of a computer system, within which instructions 1016 (for example, in the form of software components) for causing the machine 1000 to perform any of the features described herein may be executed. As such, the instructions 1016 may be used to implement modules or components described herein. The instructions 1016 cause unprogrammed and/or unconfigured machine 1000 to operate as a particular machine configured to carry out the described features. The machine 1000 may be configured to operate as a standalone device or may be coupled (for example, networked) to other machines. In a networked deployment, the machine 1000 may operate in the capacity of a server machine or a client machine in a server-client network environment, or as a node in a peer-to-peer or distributed network environment. Machine 1000 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1000 is illustrated, the term "machine" include a collection of machines that individually or jointly execute the instructions 1016.

The machine 1000 may include processors 1010, memory 1030, and I/O components 1050, which may be communicatively coupled via, for example, a bus 1002. The bus 1002 may include multiple buses coupling various elements of machine 1000 via various bus technologies and protocols. In an example, the processors 1010 (including, for example, a central processing unit (CPU), a graphics processing unit (GPU), a digital signal processor (DSP), an ASIC, or a suitable combination thereof) may include one or more processors 1012*a* to 1012*n* that may execute the instructions 1016 and process data. In some examples, one or more processors 1010 may execute instructions provided or identified by one or more other processors 1010. The term "processor" includes a multi-core processor including cores that may execute instructions contemporaneously. Although FIG. 10 shows multiple processors, the machine 1000 may include a single processor with a single core, a single processor with multiple cores (for example, a multi-core processor), multiple processors each with a single core, multiple processors each with multiple cores, or any combination thereof. In some examples, the machine 1000 may include multiple processors distributed among multiple machines.

The memory/storage 1030 may include a main memory 1032, a static memory 1034, or other memory, and a storage unit 1036, both accessible to the processors 1010 such as via the bus 1002. The storage unit 1036 and memory 1032, 1034 store instructions 1016 embodying any one or more of the functions described herein. The memory/storage 1030 may also store temporary, intermediate, and/or long-term data for processors 1010. The instructions 1016 may also reside, completely or partially, within the memory 1032, 1034, within the storage unit 1036, within at least one of the processors 1010 (for example, within a command buffer or cache memory), within memory at least one of I/O components 1050, or any suitable combination thereof, during execution thereof. Accordingly, the memory 1032, 1034, the storage unit 1036, memory in processors 1010, and memory in I/O components 1050 are examples of machine-readable media.

As used herein, "machine-readable medium" refers to a device able to temporarily or permanently store instructions and data that cause machine 1000 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1016) for execution by a machine 1000 such that the instructions, when executed by one or more processors 1010 of the machine 1000, cause the machine 1000 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1050 may include a wide variety of hardware components adapted to receive input, provide output, produce output, transmit information, exchange information, capture measurements, and so on. The specific I/O components 1050 included in a particular machine will depend on the type and/or function of the machine. For example, mobile devices such as mobile phones may include a touch input device, whereas a headless server or IoT device may not include such a touch input device. The particular examples of I/O components illustrated in FIG. 10 are in no way limiting, and other types of components may be included in machine 1000. The grouping of I/O components 1050 are merely for simplifying this discussion, and the grouping is in no way limiting. In various examples, the I/O components 1050 may include user output components 1052 and user input components 1054. User output components 1052 may include, for example, display components for displaying information (for example, a liquid crystal display (LCD) or a projector), acoustic components (for example, speakers), haptic components (for example, a vibratory motor or force-feedback device), and/or other signal generators. User input components 1054 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1050 may include biometric components 1056 and/or position components 1062, among a wide array of other environmental sensor components. The biometric components 1056 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1062 may include, for example, location sensors (for example, a Global Position System (GPS) receiver), altitude sensors (for example, an air pressure sensor from which altitude may be derived), and/or orientation sensors (for example, magnetometers).

The I/O components 1050 may include communication components 1064, implementing a wide variety of technologies operable to couple the machine 1000 to network(s) 1070 and/or device(s) 1080 via respective communicative couplings 1072 and 1082. The communication components 1064 may include one or more network interface components or other suitable devices to interface with the network(s) 1070. The communication components 1064 may include, for example, components adapted to provide wired communication, wireless communication, cellular communication, Near Field Communication (NFC), Bluetooth communication, Wi-Fi, and/or communication via other modalities. The device(s) 1080 may include other machines or various peripheral devices (for example, coupled via USB).

In some examples, the communication components 1064 may detect identifiers or include components adapted to detect identifiers. For example, the communication components 1064 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1062, such as, but not limited to, geo-location via Internet Protocol (IP) address, location via Wi-Fi, cellular, NFC, Bluetooth, or other wireless station identification and/or signal triangulation Furthermore, implementations of the present disclosure can make use of any of the features, systems, components, devices, and methods described in U.S. Patent Publication Number 20170257459 to Vaidyanathan et al., published Sep. 7, 2017 and titled "Cross-application service-driven contextual messages," the disclosure of which is herein incorporated by reference in its entirety. Other implementations may make use of the features, systems, components, devices, and methods described in U.S. Patent Publication Number 2018/0052696 to Riscutia et al., published Feb. 22, 2018, and titled "Providing Teacher User Interface Activated By User Interaction", U.S. Patent Publication Number 2016/0132234 to Riscutia et al., published May 12, 2016, and titled "User interface for application command control", U.S. patent application Ser. No. 15/694,395 to Navarro et al., filed Sep. 1, 2017, and titled "Service-Driven Dynamic User Interface Technology," and U.S. patent application Ser. No. 15/248, 104 to Navarro et al., filed Aug. 26, 2016, and titled "Data Driven Feature Discovery," each of these applications being herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for presenting educational content associated with an application, the system comprising:
   one or more processors; and
   one or more non-transitory computer readable media including instructions which, when executed by the one or more processors, cause the one or more processors to:
   register a first package with a first native application, wherein the first package associates a first usage pattern with a first triggering event and specifies at least a first native control to invoke in response to the first triggering event;
   determine, during use of the first native application, that the first triggering event has occurred based on a detected occurrence of the first usage pattern;
   in response to the determination that the first triggering event has occurred, cause the first native application to invoke the first native control which presents a first user interface element allowing navigation to a first feature of a second native application;
   receive a first user input indicating a selection of the first user interface element;
   in response to receiving the first user input, automatically navigate to the first feature of the second native application; and
   automatically cause to be presented first educational content that describes the use of the first feature of the second native application, the first educational content including an interactive tutorial that demonstrates how to perform a sequential series of actions for completing a task in the second native application using the first feature.

2. The system of claim 1, wherein the instructions further cause the one or more processors to automatically navigate to the first feature via a first deep link included in the first package.

3. The system of claim 1, wherein the instructions further cause the one or more processors to:
   register a second package with the first native application, wherein the second package associates a second usage pattern with a second triggering event and specifies at least a second native control to invoke in response to the second triggering event;
   determine, during use of the first native application, that the second triggering event has occurred based on a detected occurrence of the second usage pattern;
   in response to the determination that the second triggering event has occurred, cause the first native application to invoke the second native control which presents a second user interface element allowing navigation to a second feature of a third native application;
   receive a second user input indicating a selection of the second user interface element; and
   in response to receiving the second user input, automatically navigate to the second feature of the third native application via a deep link included in the second package by issuing a command from the first application to the third application to launch the third application and to navigate within the third application to second educational content that demonstrates how to use the second feature of the third native application.

4. The system of claim 1, wherein the instructions further cause the one or more processors to:
   register a second package with the first native application, wherein the second package associates a second usage pattern with a second triggering event and specifies at least a second native control to invoke in response to the second triggering event;
   determine, during use of the first native application, that the second triggering event has occurred based on a detected occurrence of the second usage pattern;
   in response to the determination that the second triggering event has occurred, cause the first native application to invoke the second native control which presents a second user interface element allowing navigation to a second feature of the second native application;
   receive a second user input indicating a selection of the second user interface element; and
   in response to receiving the second user input, automatically navigate to the second feature of the second native application via a deep link included in the second package by issuing a command from the first application to the second application to launch the second application and to navigate within the second application to second educational content that demonstrates how to use the second feature of the second native application.

5. The system of claim 1, wherein the instructions further cause the one or more processors to automatically transmit user-inputted data from the first native application to the second native application.

6. The system of claim 1, wherein the first feature is not available in the first native application.

7. The system of claim 1, wherein the first package includes instructions for both the first native application and the second native application.

8. The system of claim 1, wherein the presentation of the first native control occurs while the system is in an offline mode.

9. The system of claim 1, wherein the first user interface element includes educational content associated with telemetry of the first usage pattern corresponding to the first triggering event.

10. The system of claim 1, wherein the user is enabled to move to a next action of the sequential series of actions by providing an input indicating that a respective action of the sequential series of actions has been executed.

11. The system of claim 1, wherein the interactive tutorial includes a graphical element that demonstrates how to perform the sequential series of actions for completing the task.

12. A method executed on a computing device to present educational content associated with an application, the method comprising:

registering a first package with a first native application, wherein the first package associates a first usage pattern with a first triggering event and specifies at least a first native control to invoke in response to the first triggering event;

determining, during use of the first native application, that the first triggering event has occurred based on a detected occurrence of the first usage pattern;

in response to the determination that the first triggering event has occurred, causing the first native application to invoke the first native control which presents a first user interface element allowing navigation to a first feature of a second native application;

receiving a first user input indicating a selection of the first user interface element;

in response to receiving the first user input, automatically navigating to the first feature of the second native application; and automatically presenting first educational content that describes the use of the first feature of the second native application, the first educational content including an interactive tutorial that demonstrates how to perform a sequential series of actions for completing a task in the second native application using the first feature.

13. The method of claim 12, wherein the navigation to the first feature in the second native application occurs via a first deep link included in the first package.

14. The method of claim 12, further comprising:

registering a second package with the first native application, wherein the second package associates a second usage pattern with a second triggering event and specifies at least a second native control to invoke in response to the second triggering event;

determining, during use of the first native application, that the second triggering event has occurred based on a detected occurrence of the second usage pattern;

in response to the determination that the second triggering event has occurred, causing the first native application to invoke the second native control which presents a second user interface element allowing navigation to a second feature of a third native application;

receiving a second user input indicating a selection of the second user interface element; and in response to receiving the second user input, automatically navigating to the second feature of the third native application via a deep link included in the second package by issuing a command from the first application to the third application to launch the third application and to navigate within the third application to second educational content that demonstrates how to use the second feature of the third native application.

15. The method of claim 12, further comprising:

registering a second package with the first native application, wherein the second package associates a second usage pattern with a second triggering event and specifies at least a second native control to invoke in response to the second triggering event;

determining, during use of the first native application, that the second triggering event has occurred based on a detected occurrence of the second usage pattern;

in response to the determination that the second triggering event has occurred, causing the first native application to invoke the second native control which presents a second user interface element allowing navigation to a second feature of the second native application;

receiving a second user input indicating a selection of the second user interface element; and in response to receiving the second user input, automatically navigating to the second feature of the second native application via a deep link included in the second package by issuing a command from the first application to the second application to launch the second application and to navigate within the second application to second educational content that demonstrates how to use the second feature of the second native application.

16. The method of claim 12, further comprising automatically transmitting user-inputted data from the first native application to the second native application.

17. The method of claim 12, wherein the first feature is not available in the first native application.

18. The method of claim 12, wherein the first package includes instructions for the first native application and the second native application.

19. The method of claim 12, wherein the presentation of the first user interface element occurs while the computing device is in an offline mode.

20. The method of claim 12, wherein the first user interface element includes educational content associated with telemetry of the first usage pattern corresponding to the first triggering event.

* * * * *